UNITED STATES PATENT OFFICE.

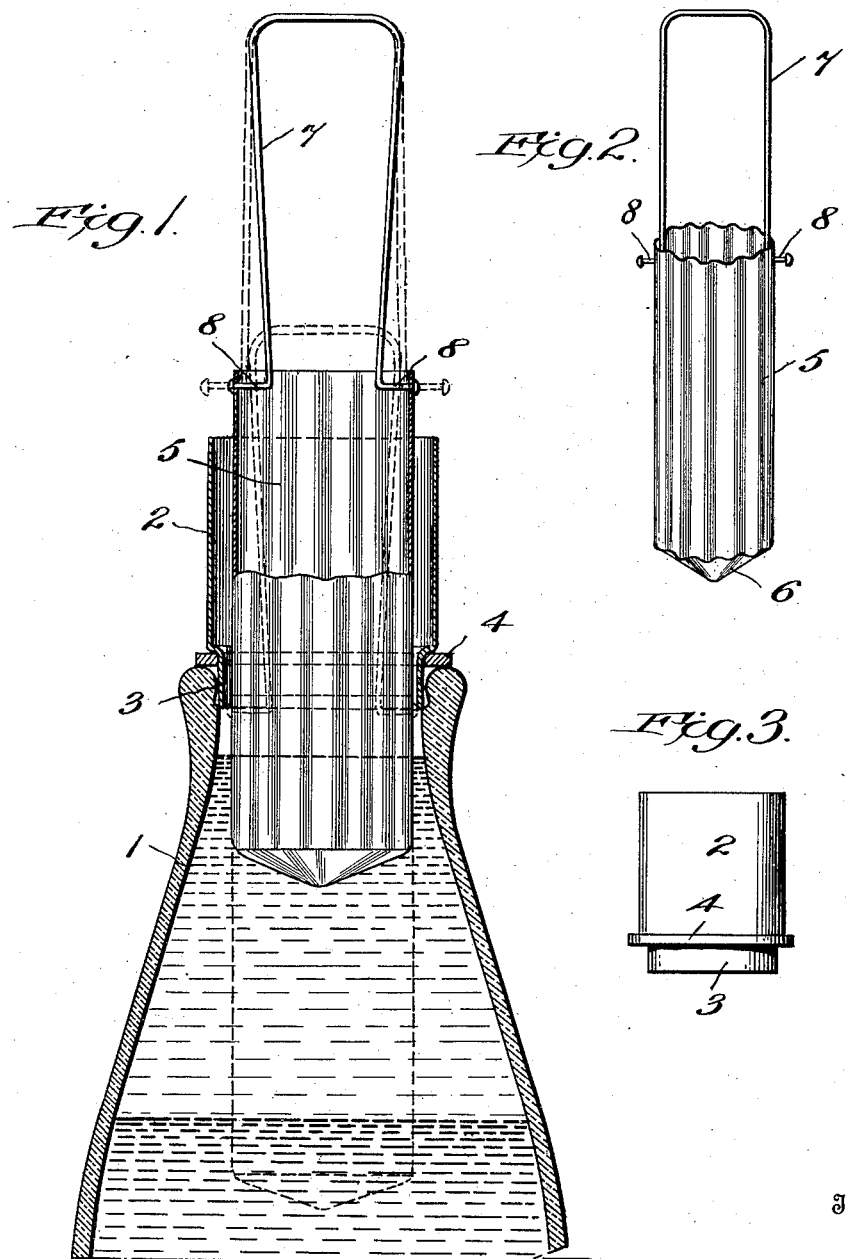

WALTER L. ELLINGWOOD, OF NEW YORK, N. Y.

CREAM-REMOVER.

1,079,848.

Specification of Letters Patent.

Patented Nov. 25, 1913.

Application filed January 10, 1913. Serial No. 741,276.

*To all whom it may concern:*

Be it known that I, WALTER L. ELLINGWOOD, a citizen of the United States, residing at New York city, in the county of New York and State of New York, have invented new and useful Improvements in Cream-Removers, of which the following is a specification.

This invention relates to cream removers and has for its object to provide a simple, cheap and practical device of this character for removing the cream that accumulates on the top of milk, delivered in the ordinary milk bottle.

To these ends the invention consists in the novel details of construction and combination of parts more fully hereinafter described and particularly pointed out in the claims.

Referring to the accompanying drawings forming a part of this specification in which like numerals designate like parts in all the views: Figure 1 is a sectional view of my improved device shown in use. Fig. 2 is a perspective view of the corrugated cup or receptacle, and Fig. 3 is a side elevational view of the supplemental container.

My cream remover is designed to be arranged in the mouth of an ordinary milk bottle 1, after the cover has been removed therefrom, and comprises the supplemental container 2 having a reduced and shouldered extending end portion 3 around the outside of which is held a rubber gasket 4, which gasket is so arranged to bear on the edge of the mouth of the bottle, whereby to form a support for the container and to prevent leakage when the device is in use.

A receptacle 5 is provided at its lower end with the tapering bottom 6 and at its upper end with a spring bail 7 the lower bearing ends 8 of which are extended at right angles to the sides of the bail for the purpose of engaging the upper end of the supplemental container for holding the receptacle suspended therein. The receptacle is adapted to be inserted through the supplemental container and the neck of the bottle for removing the cream that has accumulated on the top of the milk, the side walls of the container being corrugated longitudinally for the purpose of providing a plurality of passages for the cream.

In use the supplemental container is first arranged in position to the mouth of the milk bottle as shown and the receptacle is then passed through the container, the spring bail being first contracted so that its lower or container engaging ends will be out of the path of the upper edge of the supplemental container and its shouldered portion so that it may be readily introduced into the body of the cream therebelow. As the receptacle is inserted into the body of the cream, the cream will rise into the body of the supplemental container until it meets the descending upper or open end of the receptacle into which it will flow, the receptacle, of course, being gradually inserted into the bottle and displacing and collecting all of the cream that may have accumulated on top of the milk. After all of the cream has been collected the receptacle is withdrawn to its draining position, that is to the position where the lower projecting ends of the bail are expanded for engaging with the upper end of the supplemental container, and in which position the cream that has collected on the outside of the receptacle, is allowed to drain back into the bottle.

It is obvious that those skilled in the art may vary the details of construction and arrangements of parts without departing from the spirit of my invention and therefore I do not wish to be limited to such features except as may be required by the claims.

What is claimed as new is:

1. In a cream remover, the combination of a supplemental container adapted for insertion into the mouth of a milk bottle and provided with a stop arranged for contacting with the brim of the bottle, a container adapted to be passed through the supplemental container and further adapted to effect a rising of the liquid from the milk bottle into the container by displacing the fluid in the bottle.

2. In a cream remover, the combination of an open ended supplemental container adapted for insertion into the mouth of a milk bottle, and a container closed at its lower end and adapted to be passed through the supplemental container and further adapted to effect a rising of the liquid from the milk bottle into the container by displacing the fluid in the bottle.

3. In a cream remover, the combination of an open ended supplemental container adapted for insertion into the mouth of a milk bottle, and a container closed at its lower end and having a corrugated side wall and adapted to be passed through the supplemental container and further adapted to effect a rising of the liquid from the milk bottle into the container by displacing the fluid in the bottle.

4. In a cream remover, the combination of an open ended supplemental container adapted for insertion into the mouth of a milk bottle, and a bottomed container adapted to be passed through the supplemental container and of considerable less diameter than the supplemental container, and a handle associated with the container and having portions yieldingly held in the path of the edge of the supplemental container for the purpose set forth.

In testimony whereof I affix my signature in presence of two witnesses.

WALTER L. ELLINGWOOD.

Witnesses:
JOHN A. DONEGAN,
W. E. LAWSON.

Copies of this patent may be obtained for five cents each, by addressing the "Commissioner of Patents, Washington, D. C."